(12) United States Patent
Ogawa et al.

(10) Patent No.: US 6,926,946 B2
(45) Date of Patent: Aug. 9, 2005

(54) PARTIALLY TREATED WATER-REPELLENT GLASS SHEET

(75) Inventors: Hisashi Ogawa, Osaka (JP); Hiroaki Yamamoto, Osaka (JP); Toyoyuki Teranishi, Osaka (JP); Hiroaki Kobayashi, Osaka (JP); Shunji Kuramoto, Sagamihara (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 10/666,322

(22) Filed: Sep. 18, 2003

(65) Prior Publication Data

US 2004/0052974 A1 Mar. 18, 2004

Related U.S. Application Data

(62) Division of application No. 10/048,832, filed as application No. PCT/JP00/06244 on Sep. 13, 2000, now Pat. No. 6,685,992.

(30) Foreign Application Priority Data

Sep. 13, 1999 (JP) .......................................... 11-259458

(51) Int. Cl.$^7$ ................................................. B32B 3/00
(52) U.S. Cl. ...................... 428/172; 428/157; 428/192; 428/212; 428/213; 428/702; 428/913
(58) Field of Search .................................. 428/157, 172, 428/192, 212, 213, 432, 702, 913

(56) References Cited

U.S. PATENT DOCUMENTS 5,413,865 A    5/1995   Nakamura et al.
6,352,758 B1 *  3/2002   Huang et al. ................ 428/143

FOREIGN PATENT DOCUMENTS

| EP | 0 657 393 A1 | 6/1995 |
| EP | 0 758 629 A1 | 2/1997 |
| JP | 4-130032 | 5/1992 |
| JP | 4-305037 | 10/1992 |

* cited by examiner

Primary Examiner—Donald J. Loney
(74) Attorney, Agent, or Firm—Hamre, Schumann, Mueller & Larson, P.C.

(57) ABSTRACT

A method for partially treating a water-repellent glass sheet is disclosed which comprises irradiating part of a water-repellent glass film, formed on the water-repellent glass sheet, with a stream of plasma jets generated by a plasma jet irradiating gun. By such plasma jet irradiation, the film part can be removed easily even when the glass sheet has a curved surface. A water-repellent glass sheet with the film part removed is also disclosed.

3 Claims, 9 Drawing Sheets

PARTIALLY TREATED WATER-REPELLENT GLASS SHEET

This application is a divisional of application Ser. No. 10/048,832, filed Jan. 29, 2002, now U.S. Pat. No. 6,685,992, which application(s) are incorporated herein by reference.

TECHNICAL FIELD

The present invention relates to a method for partially treating a water-repellent glass sheet to remove part of a water-repellent function of the glass sheet. The invention also relates to a water-repellent glass sheet with part of its water-repellent film removed.

BACKGROUND ART

In recent years, water-repellent glass sheets are widely used on vehicles so as to repel rain drops from fields of view of drivers of the vehicles to thereby ensure safety driving in a rainy weather.

Such glass sheets are known from, for example, Japanese Patent Laid-Open Publication Nos. HEI-4-130032 and HEI-4-305037. The glass sheet disclosed in Japanese Patent Laid-Open Publication No. HEI-4-130032 includes a glass substrate, a film of $SiO_2$ (silicon dioxide) formed on the glass substrate, and a fluorine-based film such as that of fluorosilicon coated on the film of $SiO_2$. The fluorine-based film provides a desired water-repellent function. In Japanese Patent Laid-Open Publication No. HEI-4-305037, the glass sheet is disclosed which comprises a glass substrate, a film of $SiO_2$ formed on the glass substrate, and a fluorine-containing carbonaceous film formed on the film of $SiO_2$. The fluorine-containing carbonaceous film provides a desired water-repellent function.

These glass sheets have prolonged lives because the water-repellent films formed thereon do not peel off easily.

Of vehicular glass sheets, a water-repellent pane of glass provided sidewardly of a vehicle has a lower portion connected to a lift mechanism called a window regulator for raising and lowering the pane of glass. More specifically, the water-repellent pane of glass is connected to holders of metal by means of resin or adhesive applied thereto. The holders are then bolted to arms of the lift mechanism. The holder can be readily adhered to a laminated glass pane or another glass pane free from a water-repellent function. However, a problem is encountered in connecting the holders to a water-repellent pane of glass by means of an adhesive. More specifically, it is impossible to achieve a required adhesive strength between the adhesive and the glass pane because the water-repellent film of the water-repellent pane of glass functions to repel the adhesive. As a consequence, the holders cannot be attached to the water-repellent glass pane. To overcome this problem, either abrasives (abrasive method) or masking tapes (masking tape method) have been conventionally used.

In the abrasive method, portions of the water-repellent film that are to be connected to the holders are scraped off mechanically by use of the abrasives containing small particles of silicon oxide or cerium oxide, thereby providing the water-repellent pane of glass having parts free of the water-repellent film. Such water-repellent-film-free parts of the glass pane can then be connect d to the holders through an adhesive applied thereto.

In the masking tape method, portions of a pane of glass that are to be connected to the holders are masked by applying a masking tape thereto. A water-repellent film is then formed on the glass pane having the masked portions. Thereafter, the masking tape is peeled off from the glass pane, thereby providing the water-repellent glass pane with the portions free of the water-repellent film. Such water-repellent-film-free portions of the glass pane can then be connected to the holders through an adhesive applied thereto.

However, in the abrasive method, it is difficult and laborious to partially remove the water-repellent film by means of abrasives, thereby increasing the cost of processing of the water-repellent film.

Again, in the masking tape method, it is troublesome and laborious to apply masking tapes to the glass pane and to peel off the tapes from the glass pane. Further, it is quite difficult to achieve minute masking on the glass pane. Thus, the masking tape method is not effective for a curved pane of glass.

Reference is now made to FIG. 8 hereof schematically illustrating a conventional front glass pane or windshield. As in some conventional windshields, the illustrated windshield 101 includes wipers 102, 102 movable across the windshield to remove rain, and optical instruments such as a rain sensor 103 for detecting whether any rain drops are present on the windshield, or the amount of the rain drops on the windshield.

In FIG. 9, the windshield 101 with the rain sensor 103 is illustrated in enlarged-scale partial cross section taken along line 9—9 of FIG. 8. The windshield 101 has a water-repellent film 104 formed on an external surface of the windshield 101. The water-repellent function of the film 104 becomes gradually degraded with the lapse of years. In correspondence with the degradation, the states of adherence or rain to the windshield 101 also change. It is quite tedious to make the relevant control follow those changes. In the light of the tedious adjustments thus required of the control to follow the changes, the front glass pane 101 may as well go without the water-repellent film 104.

To this end, one may propose to provide a small window-shaped water-repellent-film-free part 105 so that the rain sensor 103 can be mounted to the windshield 101 in opposed relation to the film-free part 105. This arrangement enables automatic wiping wherein the wipers 102, 102 are automatically operated in correspondence with the amount of rain present on the film-free or non-repellent part 105 of the windshield 101. It also becomes possible to urge, by signals, or phonetic or optical means, a driver to start the wipers.

Incidentally, for prolonging the life of the water-repellent film 104, it is desirable to provide a relatively thick ground film or undercoat of $SiO_2$ interposed between the water-repellent film 104 and the front glass pane 101.

Now, the non-repellent part 105 may be formed in the water-repellent film 104 and the ground film laid thereunder by using either the abrasive method or the masking tape method. However, since the water-repellent film 104 is relatively thick, resulted edges 106 of the film 104 inevitably lie perpendicularly to a windshield surface on which the water-repellent film 104 is formed. Thus, it is liable to happen that an incident ray 107 originating from a source of light such as light of a car running on an opposite lane is reflected by the edges 106 to thereby cause mis-detection of the rain sensor 103. The abrasive method and the masking tape method are therefore not suited to form the window-shaped non-repellent part 105 in front of the sensor.

Reference is made next to FIG. 10 which schematically illustrates interrelations between a conventional door glass pane and a conventional door mirror. A driver, not shown but seated in a driver seat 111 with his hands held onto a steering wheel 112, looks into the door mirror 115 through the door glass pane 114 for rearward confirmation.

A front glass pane 116 has a water-repellent function because rain falls directly onto it. In contrast, the sideward door glass pane 114 normally comprises a non-water-repellent sheet of glass. It is, however, desirable that the door glass pane 114 has a water-repellent part 117, as illustrated, so that the driver can obtain a clear rear view of the mirror through the water-repellent part.

As can be readily appreciated, the water-repellent part 117 is surrounded by a non-water-repellent part 118 of the door glass pane 114. When the non-water-repellent part 118 is provided by means of the abrasive method or the masking tape method, an edge 119 of the water-repellent part 117 lies normal to a surface of the door glass pane 114. Then, it is likely that the edge 119, when shone with rays of light from a succeeding car or a passing-by car, or with roadside lights, undesirably serves as a reflecting surface and shines to thereby block the driver's rear view. In this instance, the water-repellent part 117 loses its significance of being provided.

DISCLOSURE OF THE INVENTION

It is accordingly an object of the present invention to provide a method for removing part of a water-repellent film formed on a glass sheet, without using abrasives and/or masking tapes.

Another object of the present invention is to provide a water-repellent sheet of glass free from the foregoing optical inconveniences.

To attain the about objects, there is provided, in accordance with one aspect of the present invention, a method for partially treating a water-repellent glass sheet to remove part of a water-repellent function of the glass sheet, which method comprises the steps of: providing a glass sheet having a water-repellent film formed thereon; and irradiating a desired part of the water-repellent film with a stream of plasma jets to thereby eliminate the desired film parts.

Since the plasma jet stream is limited in its radial expansion and narrower than a gas flame, it is possible to treat a desired portion of the water-repellent film precisely. The plasma jet irradiation may be effected by moving a plasma jet irradiation gun relative to and along a surface of the water-repellent film. Since such movement of the plasma jet irradiation gun can be achieved with no difficulty, the intended treatment can be accomplished readily even when the water-repellent glass sheet has a curved surface.

In a preferred form, the water-repellent glass sheet includes an $SiO_2$-based undercoat interposed between a surface of the glass sheet and the water-repellent film. The desired-film-part elimination may be carried out such that the undercoat is left as it is.

Provision of the $SiO_2$-based undercoat enables bonding of the water-repellent film with the water-repellent glass sheet with increased firmness. Further, with the undercoat remaining present at the repellent-film-eliminated part, optical problems as found in the conventional arrangement can be prevented.

Preferably, the plasma jet irradiating step is performed by using a plasma jet irradiation gun which is set to operate at a power output of the order of 0.5 kW, is positioned 5–15 mm distant from the glass sheet and is set to move at a velocity of 1–60 mm/sec parallel to a surface of the glass sheet in each pass of treatment.

When the distance between the plasma jet irradiation gun and the surface of the water-repellent glass sheet is less than 5 mm, stable plasma jet stream cannot be secured. Again, the distance of more than 15 mm is too long to provide a stable plasma jet stream. Thus, the distance is preferably set to fall in a range of 5 mm to 15 mm.

The term "conversion velocity" used herein represents a rate obtained when a velocity of movement of the plasma jet irradiation gun parallel to the surface of the water-repellent glass sheet is divided by the numb r of times the water-repellent glass sheet is treated with plasma jets. The conversion velocity is set to be 1 mm/sec or more, preferably 10 mm/sec or more, and more preferably 20 mm/sec or more while the conversion velocity is set to be 60 mm/sec or less, preferably 50 mm/sec or less, and more preferably 40 mm/sec or less. By using these parameters, a stable plasma jet stream is provided to thereby efficiently remove a desired part of the water-repellent film.

According to another aspect of the present invention, there is provided a water-repellent glass sheet produced by the partial treatment method described above. The glass sheet may be a curved one because it is treated by the plasma jets which achieve precise treatment.

According to a further aspect of the present invention, there is provided a water-repellent glass sheet which comprises an $SiO_2$-based undercoat formed on a surface of said glass sheet; and a water-repellent film formed on the undercoat. The water-repellent film has non-water-repellent portions provided by nullifying a water-repellent function at portions thereof where a water-repellent function is not required, and a sloped border portion separating the non-water-repellent portions and remaining water-repellent portion. The sloped border portion has a gradient water-repellent function.

At the sloped border portion where the water-repellent function is gradient, the thickness of the water-repellent film decreases gradually from 10% to 0%. As a result, undesirable shining of the border portion and mis-operation of a rain sensor disposed inside a car, which are caused by rays of light of a passing-by car shining onto the border portion and the sensor, can be prevented.

It is desirable that the undercoat remains present at the non-water-repellent portions. With the undercoat kept present at those portions, no large stepped portion will be formed thereat, whereby optical problems due to light reflection, otherwise occurring at those portions, can be avoided.

The undercoat may be formed by a sol-gel process which enables film forming at a low-temperature atmosphere. This leads to increased productivity and hence reduction in the cost of production.

BRIEF DESCRIPTION OF THE DRAWINGS

Certain preferred embodiments of the present invention will hereinafter be described in detail, by way of example only, with reference to the accompanying drawings, in which.

BEST MODE FOR CARRYING OUT THE INVENTION

The following description is merely exemplary in nature and is in no way intended to limit the invention or its application or uses.

Figure 1:
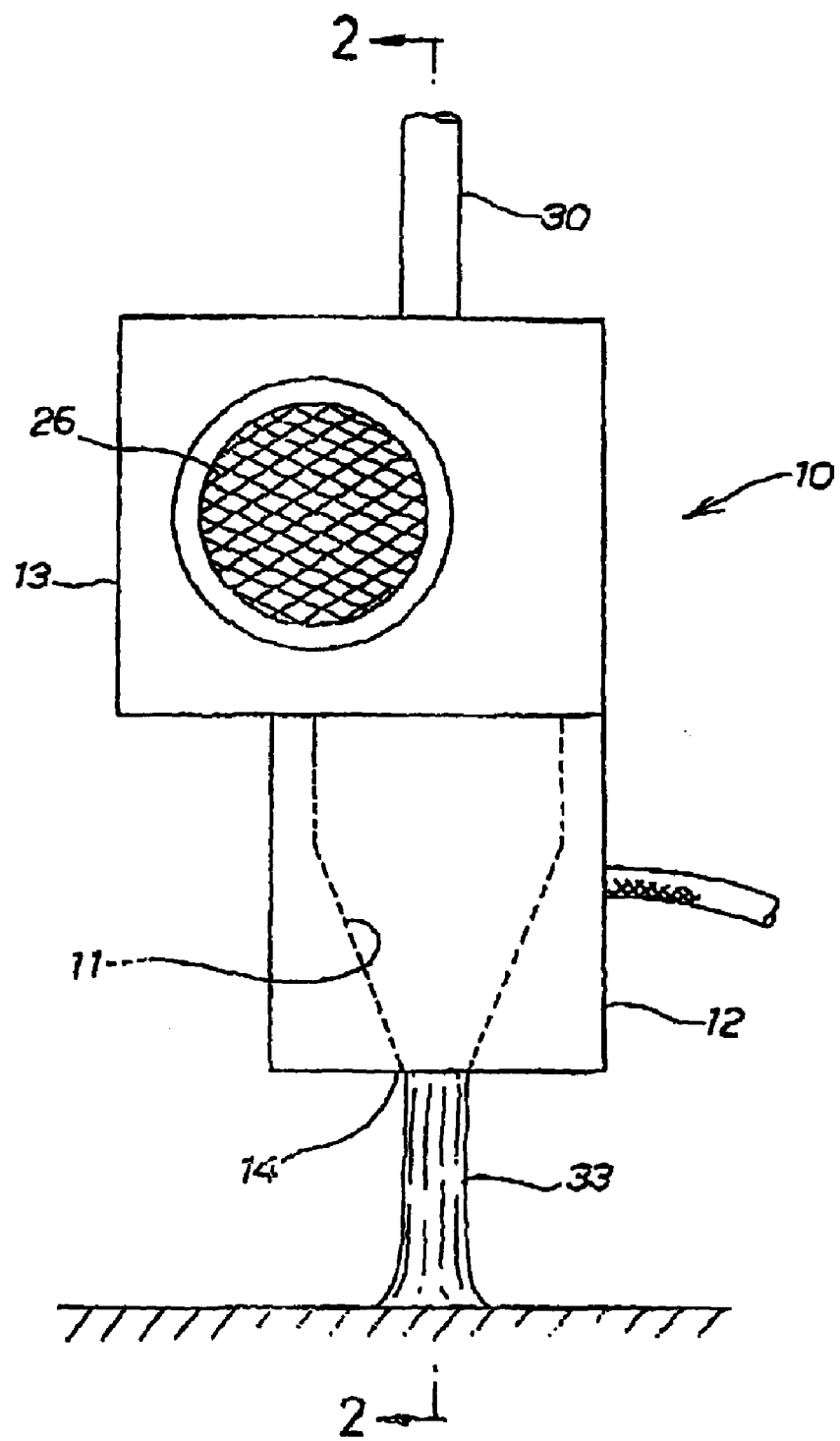
FIG. 1 is a front elevational view of a plasma jet irradiation gun for use in a method according to the present invention.

Referring to FIG. 1, a plasma jet irradiation gun 10 includes a gun body 12 having a tapering flow path 11 along which air flows, and a blower mount block 13 mounted to the gun body 12. Reference numeral 14 denotes a nozzle 14.

Figure 2:
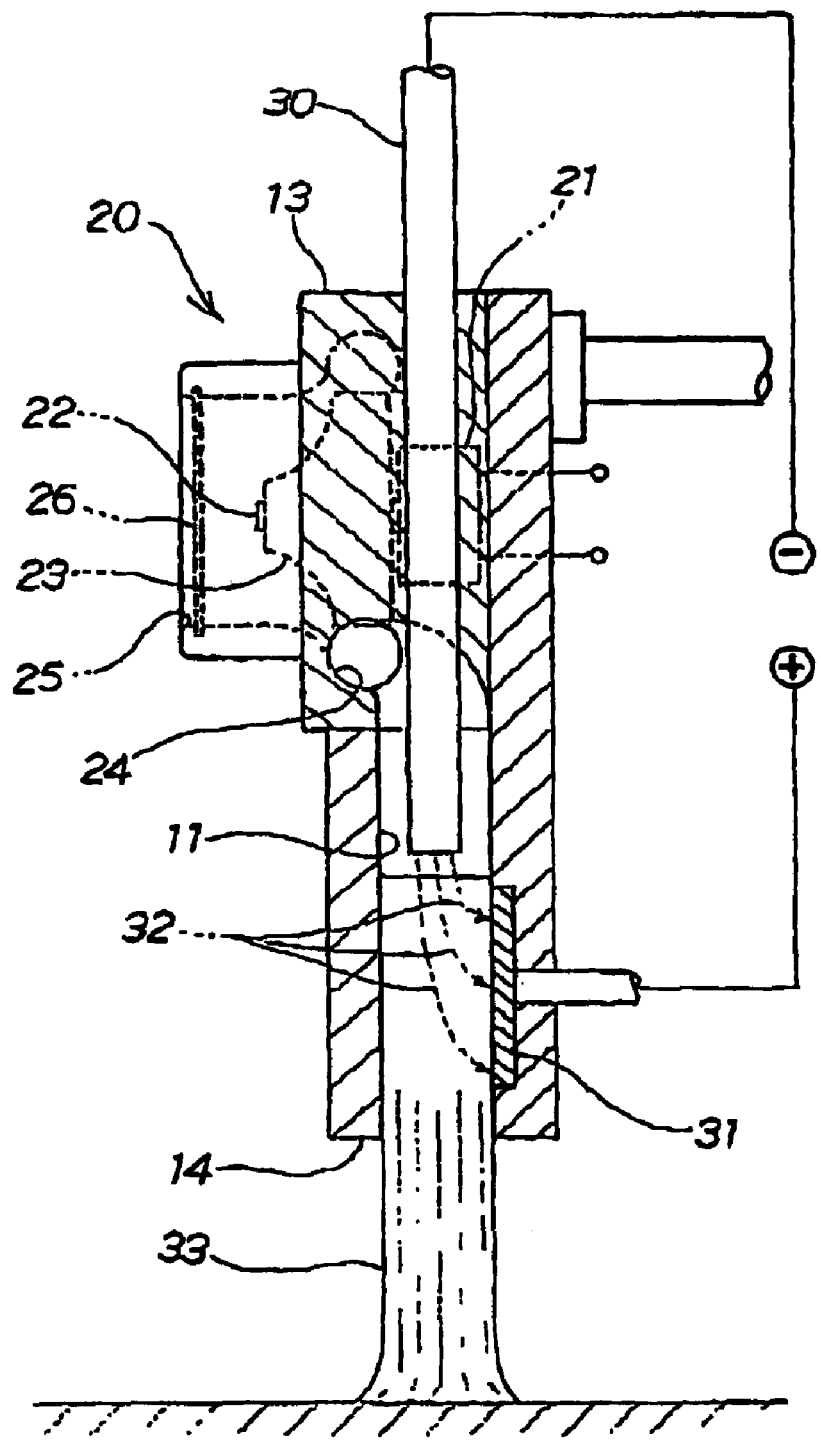
FIG. 2 is a cross-sectional view taken along line 2—2 of FIG. 1.

As shown in FIG. 2, an air fan 20 is positioned backwardly of the blower mount block 13. The air fan 20 includes a motor 21, blades 23 attached to a motor shaft 22, a spiral casing 24 wound around the blades 23, an air intake aperture 25, and a net 26. An electrode rod 30 and an electrode board 31 are provided forwardly of the air fan 20. The electrode board 31 faces toward the flow path 11.

When high voltage is applied between the electrode rod 30 and the electrode board 31, an arc-discharge 32 is produced therebetween. At the same time, the air fan 20 causes air to flow along the flow path 11 at a high velocity, thereby generating a high-speed stream of plasma jets 33. The plasma jots 33 are discharged through the nozzle 14. The plasma jets 33 having a high velocity can hardly expand radially and thus flow in a generally linear stream.

Figure 3A:
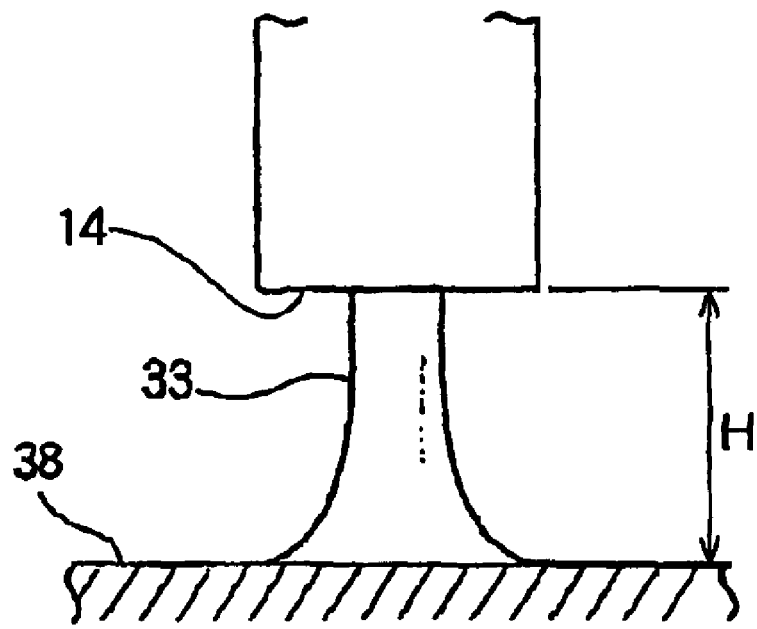
FIG. 3A illustrates how a water-repellent glass sheet is irradiated with plasma jets by use of the plasma jet irradiation gun.
Figure 3B:
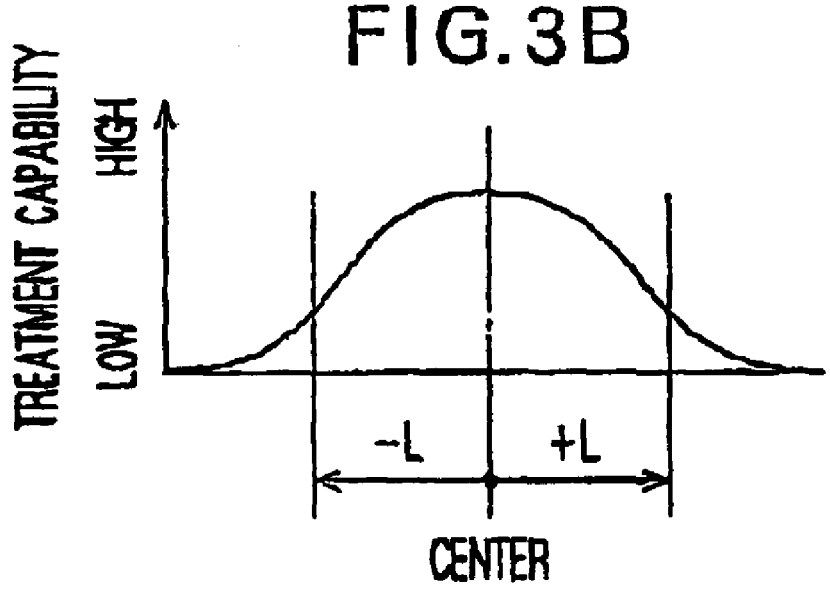
FIG. 3B is a graphical illustration of the treatment capability of the plasma jets.

As shown in FIG. 3A, a nozzle 14 is positioned away from a surface of a glass sheet 38 by a distance H. As the plasma jets 33 are blown onto the surface of the glass sheet 38, the plasma jet stream expands radially to some extent. The capability of the plasma jets to treat the glass sheet 38 depends on the density of the plasma jets irradiated onto the glass sheet. As can be seen from the graph of FIG. 3B, the capability becomes highest at the center and gradually decreases with increase in distance L from the center to thereby provide a characteristic curve in the form of a bell.

Figure 4A:
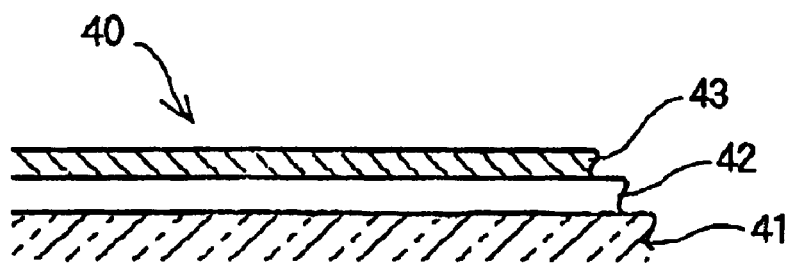
FIG. 4A is a cross-sectional view illustrating the water-repellent glass sheet to be irradiated with plasma jets.

Next, reference is made to FIG. 4A illustrating, in cross-section, the construction of a water-repellent glass sheet to be treated by the method according to the present invention.

As shown in FIG. 4A, a water-repellent glass sheet 40 includes a glass sheet 41 with a ground film or undercoat 42 formed thereon, and a water-repellent film 43 laid over the undercoat 42. The undercoat 42 has a thickness of 30 to 40 nm and contains $SiO_2$ (silicon dioxide) a chief component. The water-repellent film 43 in made of a fluorine-containing carbonaceous film of, for example, 2 to 5 nm thickness.

Figure 4B:
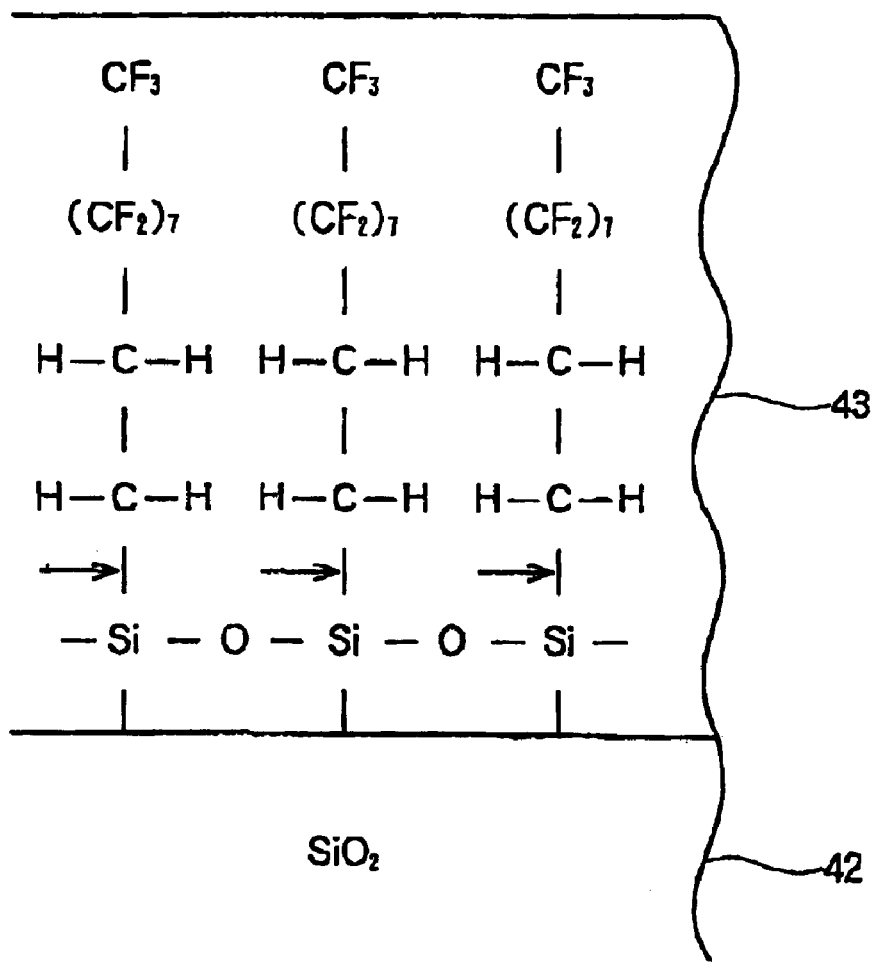
FIG. 4B is a diagrammatic illustration of the molecular structure of the water-repellent film.

The water-repellent film 43 has a molecular structure as diagrammatically shown in FIG. 4B. The undercoat 42, made of $SiO_2$, is bonded to silicon of the water-repellent film 43. Each silicon is bonded to hydrocarbon radical —$CH_2$—$CH_2$— bonded to fluorocarbon group —$(CF_2)_7$—$CF_3$ to thereby provide the molecular structure —Si—$CH_2$—$CH_2$—$(CF_2)_7$—$CF_3$.

Figure 5A:
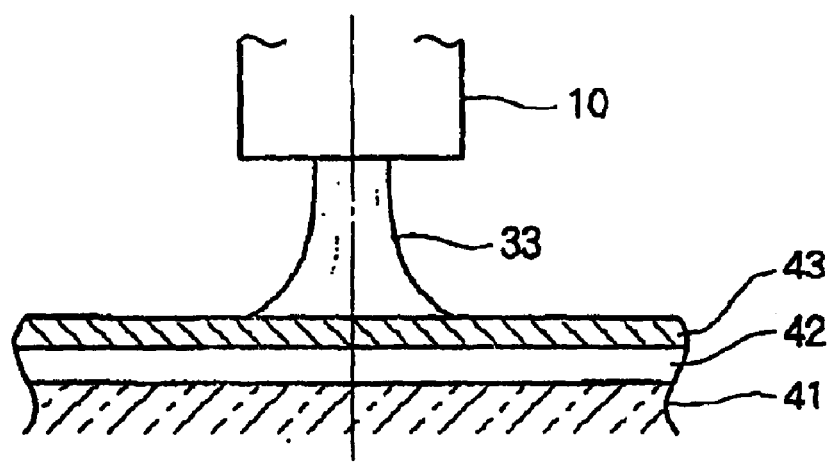
FIG. 5A illustrates the water-repellent glass chest being treated with the plasma jets.
Figure 5B:
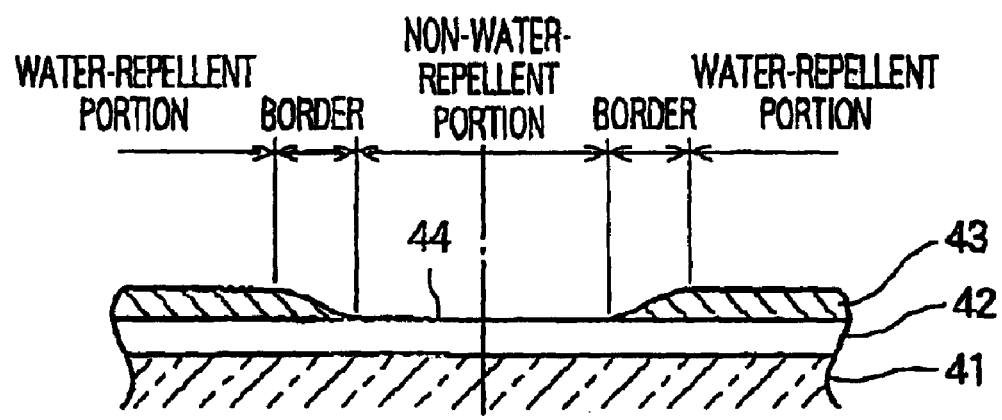
FIG. 5B is a cross-sectional view illustrating the water-repellent film with part eliminated as a result of the irradiation with the plasma jets.

Reference is now made to FIGS. 5A and 5B illustrating the partial treatment method according to the present invention. The plasma jet irradiation gun 10 irradiates the water-repellent film 43 with the plasma jets 33, as shown in FIG. 5A, whereupon a reaction as described below is brought about by the energy of the plasma jets 33.

Each bond between silicon and carbon, indicated by horizontally directed arrows in FIG. 4B, is primarily broken, whereby the water-repellent function is eliminated.

As shown in FIG. 5B, the water-repellent glass sheet 40 includes a portion directly irradiated with the plasma jets 33 in such a manner as to remove the water-repellent film 43 having the water-repellent function. More specifically, fluorine-containing groups having the water-repellent function are eliminated by the plasma jets. Such a portion free from the water-repellent film 43 is hereinafter referred to as "non-water-repellent portion". The water-repellent glass sheet 40 also includes a "water-repellent portion" not irradiated with the plasma jets 33. The water-repellent portion has the water-repellent film 43 left unremoved. Between the non-water-repellent portion and the water-repellent portion, there is provided a "border portion". The border portion gradually decreases in irradiance towards the water-repellent portion to thereby provide an inclined or sloped surface.

EXPERIMENTS

Experiments in the present invention will be discussed below. However, the present invention is not limited to the experiments to be described below. The plasma jet irradiation gun 10 moves in parallel to the surface of the water-repellent glass sheet 40 when the water-repellent glass-sheet 40 is treated with plasma jets.

EXAMPLE 1

EXPERIMENTAL EQUIPMENT: APPARATUS FOR TREATING FORMED PRODUCT WITH PLASMA JETS (available from COROTEC Corp.)

SAMPLE: water-repellent glass sheet (including an undercoat of $SiO_2$ having a thickness or 40 nm, and a water-repellent film of perfluoroalkylsilane having a thickness of 4 nm)

DISTANCE H: 10 mm (See FIG. 3A)

POWER: 0.5 kW for each plasma jet irradiation gun

Figure 6:
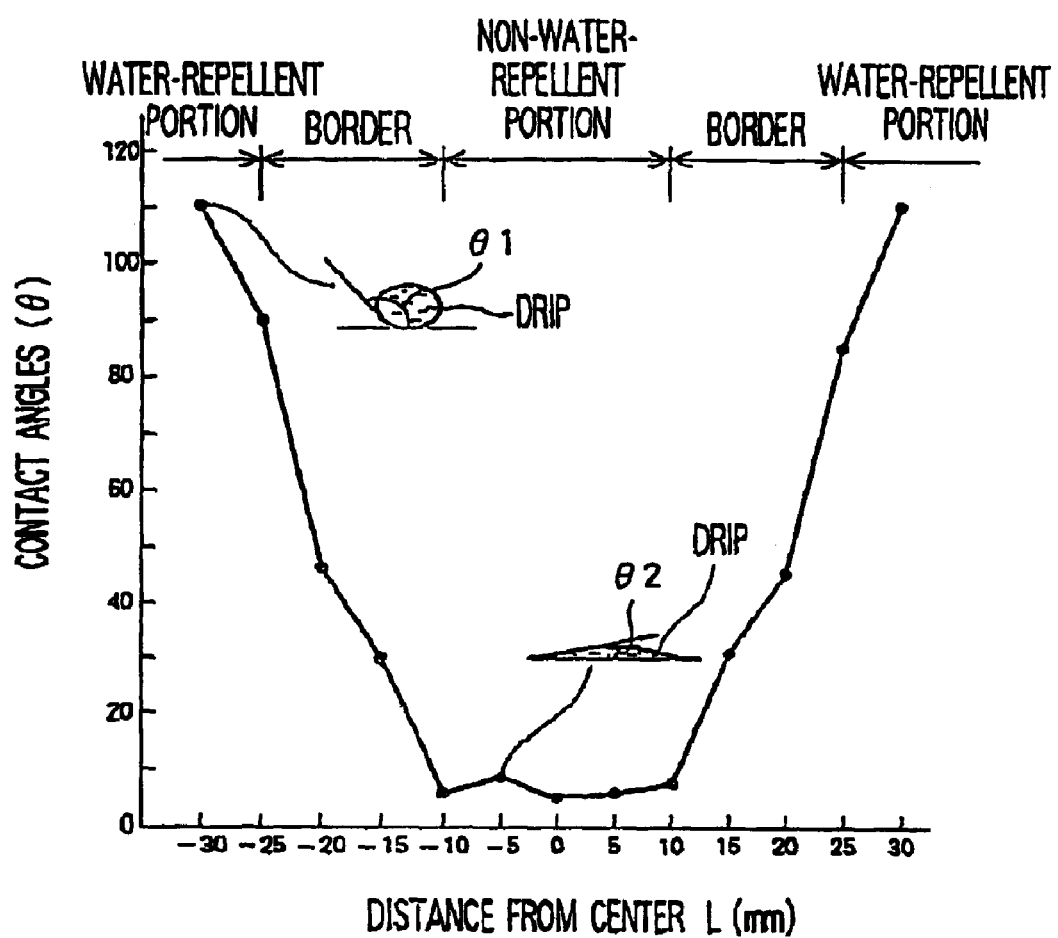
FIG. 6 is a graph showing contact angles obtained in an experimental example.

STRIKING VELOCITY OF PLASMA JETS (rate at which plasma jets impact upon a sample): about 7 m/s VELOCITY OF PLASMA JET IRRADIATION GUN (in movement parallel to the water-repellent glass sheet surface); 100 mm/sec TREATMENT: two times CONVERSION VELOCITY: 50 mm/sec EVALUATION: contact angle FIG. 6 is a graph showing contact angles obtained from EXAMPLE 1. A horizontal axis shows the distance L (See FIG. 3B) from the center of the surface of the water-repellent glass sheet irradiated with plasma jets. A vertical axis shows contact angles θ. A contact angle θ is given between the surface of the water-repellent glass sheet and the surface of a drip or raindrop placed on the former. The contact angle is important in determining the water-repellent function of the water-repellent glass sheet. The greater the contact angles θ are, the higher the water-repellent function becomes. In the graph, the contact angle θ1 is about 110° to provide a "water-repellent state" in which water is repelled.

Contact angle θ2 is about 10° in which angle a rain-drop takes a flattened shape and adheres to the water-repellent glass sheet 40 with increased firmness. This state may be called "wettability". When wettability is high, it is unlikely that a primer or an adhesive agent is repelled. Then, holders can be fixedly attached to the glass sheet with a minimum of difficulty.

EXAMPLES 2 to 4

EXPERIMENTAL EQUIPMENT: APPARATUS FOR TREATING FORMED PRODUCT WITH PLASMA JETS (available from COROTEC Corp.)
SAMPLE: water-repellent glass sheet (including an undercoat of $SiO_2$ having a thickness of 30 to 40 nm, and a water-repellent film or perfluoroalkylsilane having a thickness of 2 to 5 nm)
DISTANCE H: 10 nm
POWER: 0.5 kW for each plasma jet irradiation gun
STRIKING VELOCITY OF PLASMA JET: about 7 m/s
VELOCITY OF PLASMA JET IRRADIATION GM: 100, 20, and 120 nm/sec
TREATMENT: four times or once

TABLE 1

|  | EXAMPLE 1 | EXAMPLE 2 | EXAMPLE 3 | EXAMPLE 4 |
|---|---|---|---|---|
| DISTANCE H | 10 mm | 10 mm | 10 mm | 10 mm |
| VELOCITY OF PLASMA JET IRRADIATION GUN | 100 mm/sec | 100 nm/sec | 10 mm/sec | 120 mm/sec |
| TREATMENT | twice | four times | once | once |
| CONVERSION VELOCITY | 50 mm/sec | 25 mm/sec | 10 mm/sec | 120 mm/see |
| EVALUATION | good | good | good | no good |

$$\text{CONVERSION VELOCITY} = \frac{\text{VELOCITY OF THE PLASMA JET IRRADIATION GUN}}{\text{NUMBER OF TIMES SAMPLE IS TREATED}}$$

In EXAMPLE 2, the velocity of the plasma jet irradiation gun is met to be 100 mm/sec. The number of times the water-repellent glass sheet is treated is four. Thus, the conversion velocity is 25 mm/sec to thereby achieve a sufficiently small contact angle. Therefore, the evaluation of EXAMPLE 2 is good.

In EXAMPLE 3, the plasma jet irradiation gun has a low velocity of 10 mm/s. The water-repellent glass sheet is treated once. The conversion velocity is therefore 10 mm/s. Because the plasma jet irradiation gun moves at a low velocity, good evaluation can be obtained by treating the water-repellent glass sheet only once.

In EXAMPLE 4, the water-repellent glass sheet in treated with the plasma jet irradiation gun having a high velocity of 120 mm/s. The water-repellent glass sheet is treated once. The conversion velocity is 120 mm/s. Consequently, a contact angle varies and hence, the desired contact angle can not be achieved. For this reason, the evaluation is no good.

The adhesive strength for a water-repellent glass sheet treated in accordance with the present invention was measured.

Figure 7A:
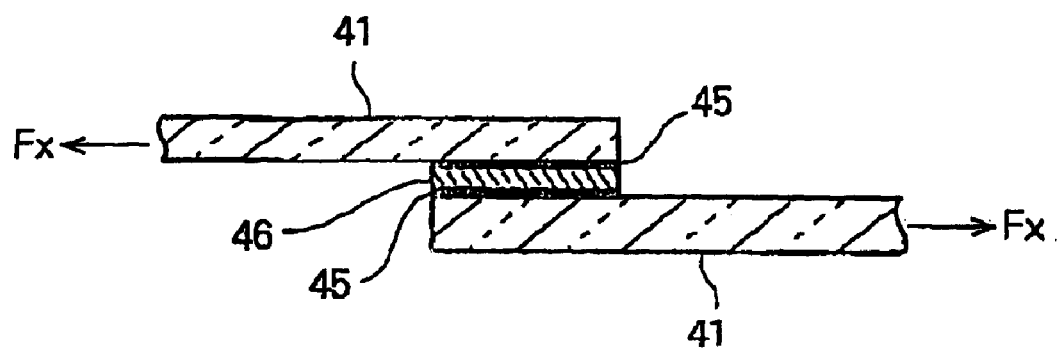
FIGS. 7A and 7B illustrate the principles of tension and peeling tests for measuring the adhesive strength between glass sheets and adhesives.
Figure 7B:
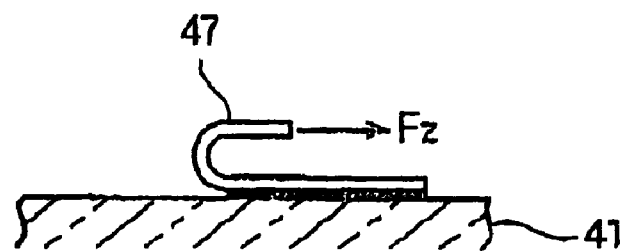
Figure 8:
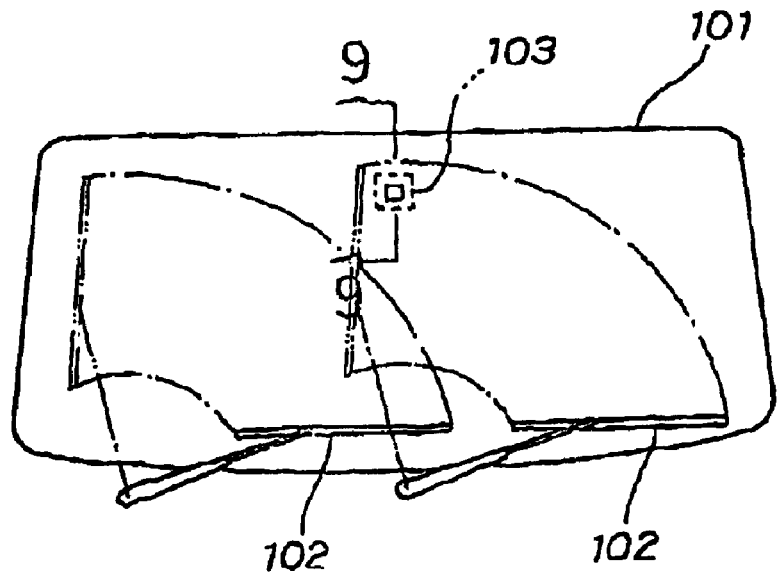
FIGS. 8–10 illustrate the prior art.
Figure 9:
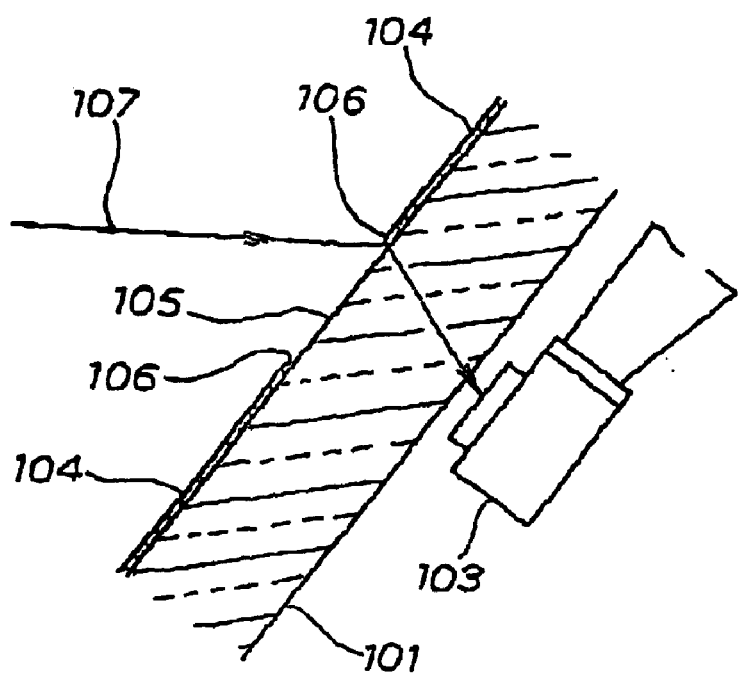
Figure 10:
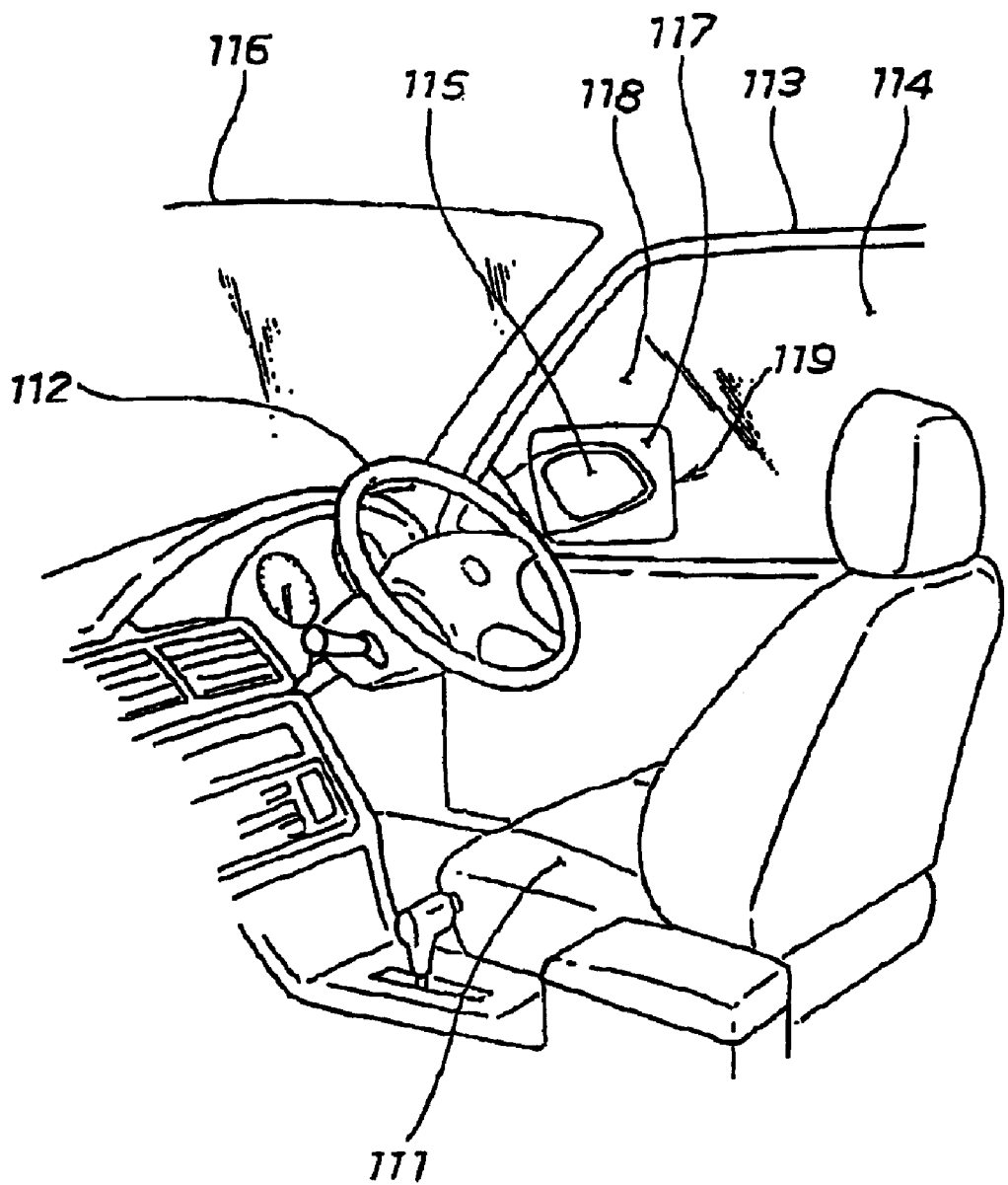

FIGS. 7A and 7B illustrate the principles of tension and peeling tests for measuring the adhesive strength between glass sheets and adhesives.

As shown in FIG. 7A, each glass sheet 41 is coated with a primer 45. The glass sheets 41, 41 thus arranged lie over the other with an urethane resin 46 sandwiched between the primers 45, 45. The urethane resin 46 has an area of 25 mm by 23 mm. The glass sheets 41, 41 are then separated from each other by forces Fx, Fx applied thereto. Such forces Fx, Fx required to separate the glass sheets 41, 41 from each other are the adhesive strength in the tension test.

Turning to FIG. 7B, a ribbon 47 includes a portion adhered to the glass sheet 41 and having a width of 25 mm. The ribbon 47 is then peeled off the glass sheet 47 by a force Fz applied thereto, as shown in FIG. 7B. Such a force Fz is the adhesive strength in the peeling test.

EXAMPLES 5 to 7

EXPERIMENTAL EQUIPMENT: APPARATUS FOR TREATING FORMED PRODUCT WITH PLASMA JET (available from COROTEC Corp.)
SAMPLE: water-repellent glass sheet (including an undercoat of $SiO_2$ having a thickness of 30 to 40 nm, and a water-repellant film of perfluoroalkylsilane having a thickness of 2 to 5 nm) or a conventional glass sheet
DISTANCE H: 10 mm
POWER: 0.5 kW for each plasma jet irradiation gun
STRIKING VELOCITY OF PLASMA JET: about 7 m/s
VELOCITY OF PLASMA JET IRRADIATION GUN: 40 mm/sec
TREATMENT: twice
CONVERSION VELOCITY: 20 mm/sec

TABLE 2

|  | EXAMPLE 5 | EXAMPLE 6 | EXAMPLE 7 |
|---|---|---|---|
| Distance H | 10 mm | 10 mm | 10 mm |
| Velocity of PlasmJet Irradiation Gun | 40 mm/s | 40 mm/s | 40 mm/s |
| Treatment | twice | twice | twice |
| Conversion Velocity | 20 mm/s | 20 mm/s | 20 mm/s |
| Tested Portion | non-water-repellent portion | water-repellent portion | surface of conventional glass sheet |
| Adhesive Strength Fx | 80 kgf | 0 | 59 kgf |
| Adhesive Strength FZ | 10 kg or more | 0 | 10 kg or more |
| Failure | cohesive failure | interfacial failure | cohesive failure |

In EXAMPLE 5, the non-water-repellent portion of the water-repellent glass sheet is tested. Because the water-repellent film is treated with plasma jet in such a manner as to eliminate the water-repellent function of the former, the adhesive strength Fx in the tension test is 80 kgf while the adhesive strength Fz in the peeling test is 10 kgf or more. Moreover, interfacial failure did not occur at the non-water-repellent portion.

In EXAMPLE 6, the water-repellent portion of the water-repellent glass sheet is tested. The adhesive strength Fx in the tension test and the adhesive strength Fz in the peeling test are both zero, and interfacial failure occurred at the water-repellent portion. This means that because the water-repellent portion repels adhesive, the glass sheets 41, 41 can not be bonded together while the ribbon 47 can not be bonded to the glass sheet 41.

In EXAMPLE 7, the conventional glass sheet is tested for comparison to EXAMPLE 5 and EXAMPLE 6. The adhesive strength Fx is 59 kgZ while the adhesive strength Fz is 10 kgf or more. Also, interfacial failure did not occur on the surface of the conventional glass sheet. Results of EXAMPLES 5 to 7 indicate that the non-water-repellent portion provides the adhesive strength equal to or greater than that provided by the conventional glass sheet.

Further, the previously stated experiments were performed repeatedly. Results obtain d from those experiments show that the present invention can be carried out when the distance H is in the range of 5 to 15 mm. The distance H of less than 5 mm provides unstable plasma jet. When the distance H is more than 15 mm, plasma jet is too long. Therefore, the distance H is preferably set to be 5 mm or more and be up to 15 mm. The power is set to be between 0.3 and 1 kW.

The results of the above described experiments indicate that the desired treatment can be performed when the conversion velocity ranges from 10 to 50 mm/s. Next, experiments were carried out so as to determine the desired upper and lower limits of conversion velocity effective to obtain satisfactory results.

EXAMPLES 8 to 16

EXPERIMENTAL EQUIPMENT: PLASMA JET MADE PRODUCT TREATING APPARATUS (available from COROTEC Corp.)
SAMPLE: a water-repellent glass sheet (including an undercoat of $SiO_2$ having a thickness of 30 to 40 nm, and a water-repellent film of perfluoroalkylsilane having a thickness of 2 to 5 nm)
DISTANCE H: 10 mm
POWER: 0.5 kW for each plasma jet irradiation gun
STRIKING VELOCITY OF PLASMA JET: about 7 m/s
VELOCITY OF PLASMA JET IRRADIATION GUN: 0.5 to 70 mm/s
TREATMENT: once faster than that in EXAMPLE 8. Therefore, the number of the non-water-repellent portions produced in EXAMPLE 9 is twice that in EXAMPLE 8. Thus, the cost efficiency is fair in evaluation. Thus, the total evaluation on EXAMPLE 9 is fair.

In EXAMPLE 10, the conversion velocity is 10 mm/sec. The water-repellent film was satisfactorily eliminated to thereby obtain a very good evaluation on the treatment. The plasma jet irradiation gun in EXAMPLE 10 moves much faster than that in EXAMPLE 9 to thereby obtain a good evaluation on the cost efficiency. The total evaluation on EXAMPLE 10 is therefore good.

In EXAMPLE 11, the conversion velocity is 20 mm/sec. The water-repellent film was satisfactorily eliminated to thereby obtain a very good evaluation on the treatment. The velocity of the plasma jet irradiation gun in EXAMPLE 11 is much greater than that in EXAMPLE 10 to thereby obtain an evaluation of very good on the cost efficiency. Therefore, the total evaluation on EXAMPLE 11 is very good.

In EXAMPLE 12, the conversion velocity is 30 mm/sec. The water-repellent film was satisfactorily eliminated to thereby obtain a very good evaluation on the treatment. The velocity of the plasma jet irradiation gun in EXAMPLE 12 is greater than that in EXAMPLE 11 to thereby obtain a very good evaluation on the cost efficiency. Consequently, the total evaluation on EXAMPLE 12 is very good.

In EXAMPLE 13, the conversion velocity is 40 mm/sec. The water-repellent film was satisfactorily eliminated to thereby obtain a very good evaluation on the treatment. The velocity of the plasma jet irradiation gun in EXAMPLE 13 is greater than that in EXAMPLE 12 to thereby obtain an evaluation of very good on the cost efficiency. The total evaluation on EXAMPLE 13 is thus very good.

In EXAMPLE 14, the conversion velocity is 50 mm/sec. The velocity of the plasma jet irradiation gun in EXAMPLE 14 is greater than that in EXAMPLE 13 to thereby obtain an evaluation of very good on the cost efficiency. However, since the velocity of the plasma jet irradiation gun in

TABLE 3

|  | Example 8 | Example 9 | Example 10 | Example 11 | Example 12 | Example 13 | Example 14 | Example 15 | Example 16 |
| --- | --- | --- | --- | --- | --- | --- | --- | --- | --- |
| Distance H (mm) | 10 | 10 | 10 | 10 | 10 | 10 | 10 | 10 | 10 |
| Velocity of Plasma Jet Irradiation Gun (mm/s) | 0.5 | 1.0 | 10 | 20 | 30 | 40 | 50 | 60 | 70 |
| Frequency of Treatment | once | once | once | once | once | once | once | once | once |
| Conversion Velocity (mm/s) | 0.5 | 1.0 | 10 | 20 | 30 | 40 | 50 | 60 | 70 |
| Evaluation on Treatment | Very Good | Very Good | Very Good | Very Good | Very Good | Very Good | Good | Fair | No Good |
| Evaluation on Cost Efficiency | No Good | Fair | Good | Very Good | Very Good | Very Good | Very Good | Very Good | Very Good |
| Total Evaluation | No Good | Fair | Good | Very Good | Very Good | Very Good | Good | Fair | No Good |

In EXAMPLE 8, the conversion velocity is 0.5 mm/sec. The water-repellent film was satisfactorily eliminated to thereby obtain an evaluation of very good on the treatment. However, the velocity of the plasma jet irradiation gun is too low to treat the water-repellent film with plasma jets in a short time. It is therefore not possible to provide a large number of non-water-repellent portions. Thus, the evaluation on cost efficiency or economy is no good. The worse of the two evaluations on the treatment and the economy is used to establish a total evaluation. As a result, the total evaluation on EXAMPLE 8 is no good.

In EXAMPLE 9, the conversion velocity is 1.0 mm/sec. The water-repellent film was satisfactorily eliminated to thereby obtain an evaluation of very good on the treatment. The plasma jet irradiation gun in EXAMPLE 9 moves twice EXAMPLE 14 is higher than that in EXAMPLE 13, the water-repellent film was removed to a smaller extent in EXAMPLE 14 than in EXAMPLE 13. Thus, the evaluation on the treatment is good to thereby obtain a total evaluation of good.

In EXAMPLE 15, the conversion velocity is 60 mm/s. The velocity of the plasma jet irradiation gun in EXAMPLE 15 is greater than that in EXAMPLE 14 to thereby obtain a very good evaluation on the cost efficiency. However, since the plasma jet irradiation gun in EXAMPLE 15 has a much greater velocity than that in EXAMPLE 14, the water-repellent film was removed to a smaller extent in EXAMPLE 15 than in EXAMPLE 14. The conversion velocity in EXAMPLE 15 is an upper limit for obtaining a fair evaluation on the treatment. The total evaluation on EXAMPLE 15 is thus fair because the evaluation on the treatment is fair.

In EXAMPLE 16, the conversion velocity is 70 mm/sec. The velocity of the plasma jet irradiation gun in EXAMPLE 16 is greater than that in EXAMPLE 15 to thereby obtain a very good evaluation on the cost efficiency. However, since the plasma jet irradiation gun has a high velocity, the water-repellent film was not satisfactorily eliminated. The evaluation on the treatment is therefore no good with the result that the total evaluation on EXAMPLE 16 is also no good.

The results of the experiments in EXAMPLES 8 to 16 show that the conversion velocity should be 1 mm/sec or more, preferably 10 mm/sec or more, and more preferably 20 mm/sec or more while the conversion velocity should be 60 mm/sec or less, preferably 50 mm/sec or less, and more preferably 40 mm/sec or less.

Additionally, water-repellent films formed using the following compounds were treated in accordance with the present invention. As a result, these water-repellent films were satisfactorily removed to provide desired non-water-repellent portions.

Compound 1 where A and n denote methyl group and an integer between 1 and 50, respectively.

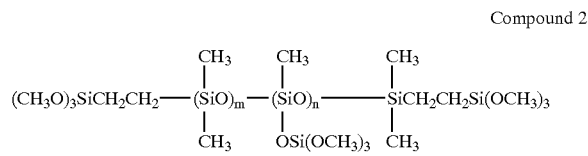

Compound 2 where m is an integer in the range of 3 to 100, n designates an integer between 0 and 50, m+n is 5 or more and up to 100 and preferably 10 or more and up to 50.

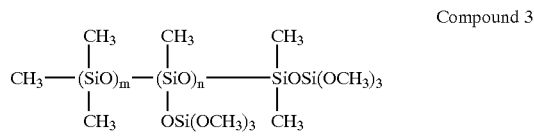

Compound 3 where m denotes an integer in the range of 3 to 100, n is an integer between 0 and 50, and m+n is 5 or more and up to 100 and preferably 10 or more and up to 50.

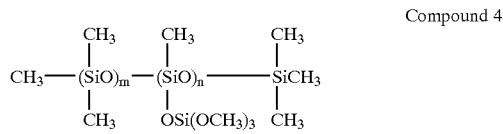

Compound 4 where m is an integer between 3 and 100, n denotes an integer in the range of 0 to 50, and m+n is 5 or more and up to 100 and preferably 10 or more and up to 50.

The water-repellent films obtained using the previously described compounds 1 through 4 do not contain fluorine but have a capability of repelling water. Such water-repellent films could be effectively treated in accordance with the present invention.

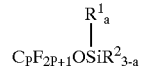

Compound 5 where $R^1$ represents a hydrocarbon radical having 1 to 4 carbon atoms with one hydrogen atom removed, $R^2$ designates an acyloxy group or au alkoxyl group having from 1 to 4 carbon atoms, Q denotes an organic group of from 2 to 10 carbon atoms in which two hydrogen atoms are removed, a is zero or one, and P is an integer between 1 and 12.

Although the compact and useful plasma jet irradiation gun 10 is employed in the embodiment of the present invention, the construction of the plasma jet irradiation gun is not limited to that described in relation to FIGS. 1 and 2 as long as a device for generating plasma jets is employed.

INDUSTRIAL APPLICABILITY

As thus far explained, in accordance with the present invention, part of a water-repellent function or film of a water-repellent glass sheet con be removed easily by means of plasma jets. As a result, when the water-repellent glass sheet is used as an automobile door glass pane, holders of a window regulator for raising and lowering the door glass pane can bc attached with increased firmness to the non-water-repellent part of the glass pane by means of an adhesive because the adhesive is no longer repelled.

The door glass pane often comprises a non-water-repellent glass sheet. However, it is desirable that the glass sheet or door glass pane has a water-repellent part so that a driver can look through that part into a fender or door mirror to obtain a clear rear view in a rainy weather. Such a water-repellent part can be provided easily by the inventive partial treatment process using plasma jets.

Also, when the glass sheet with the water-repellent-film-free part is used as a windshield of a vehicle, a rain sensor can be mounted to the windshield in opposed relation to the water-repellent-film-free part. As a result, the rain censor can surely detect rain because rain fell on the water-repellent-film-free part is not repelled and stays there f r detection. This further enables the provision of an automatic wiping system.

Although the glass sheet treated in accordance with the present invention has been described in relation to use on and application to an automobile, it should not be limited to such use and application. For example, the inventive glass sheet can also be applied to trains, airplanes, boats and other means of transportation employing sheets of glass.

What is claimed is:

1. A water-repellent glass sheet comprising:
   an SiO2-based undercoat formed on a surface of said glass sheet; and
   a water-repellent film formed on said undercoat,
   said water-repellent film having non-water-repellent portions provided by nullifying a water-repellent function at portions thereof where a water-repellent function is not required, and a sloped border portion separating said non-water-repellent portions and remaining water-repellent portion, said sloped border portion having a gradient water-repellent function.

2. A water-repellent glass sheet as defined in claim 1, wherein said undercoat remains present at said non-water-repellent portions.

3. A water-repellent glass sheet as defined in claim 1, wherein said undercoat is formed by a sol-gel process.

* * * * *